3,109,282
Patented Nov. 5, 1963

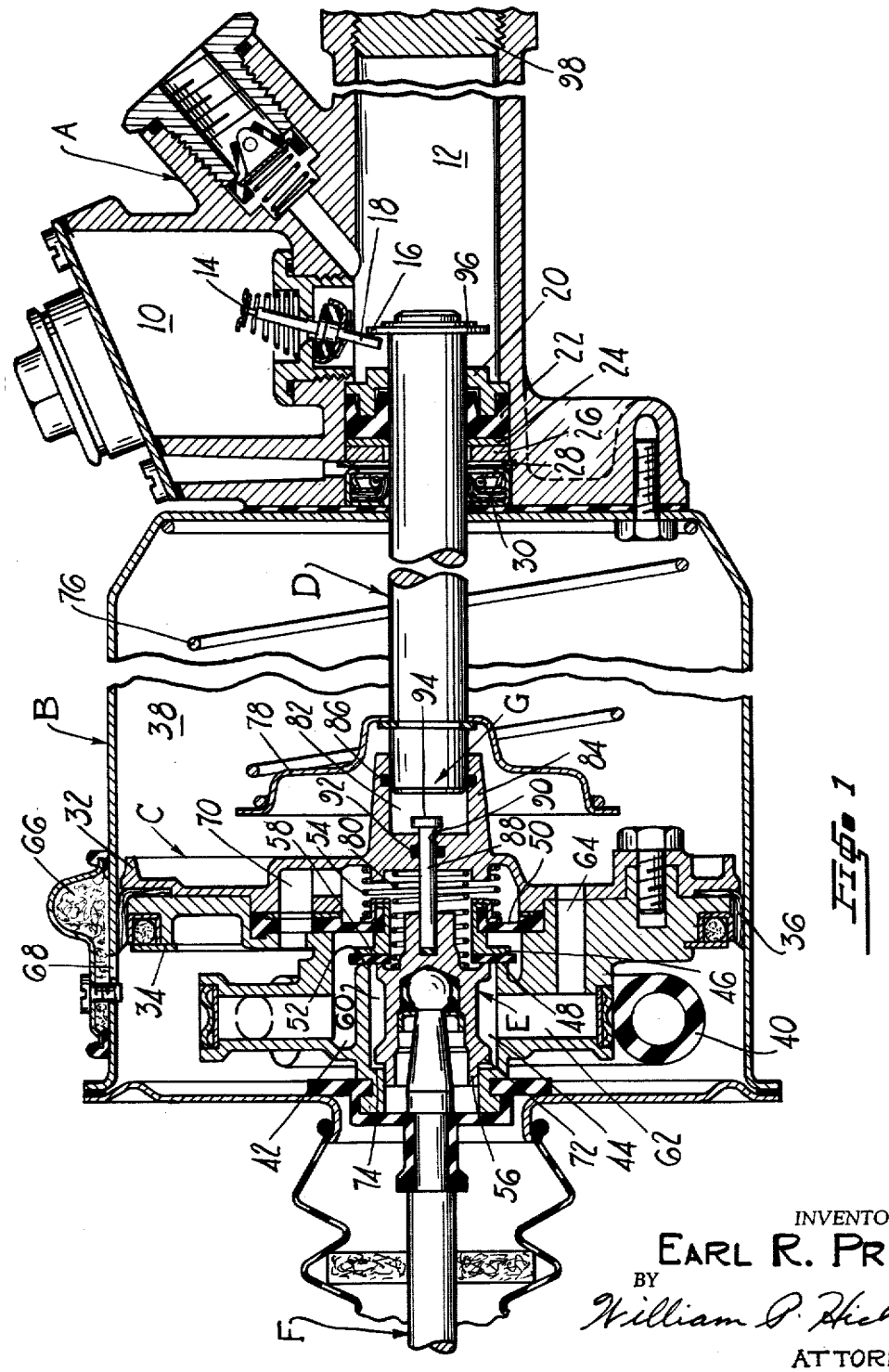

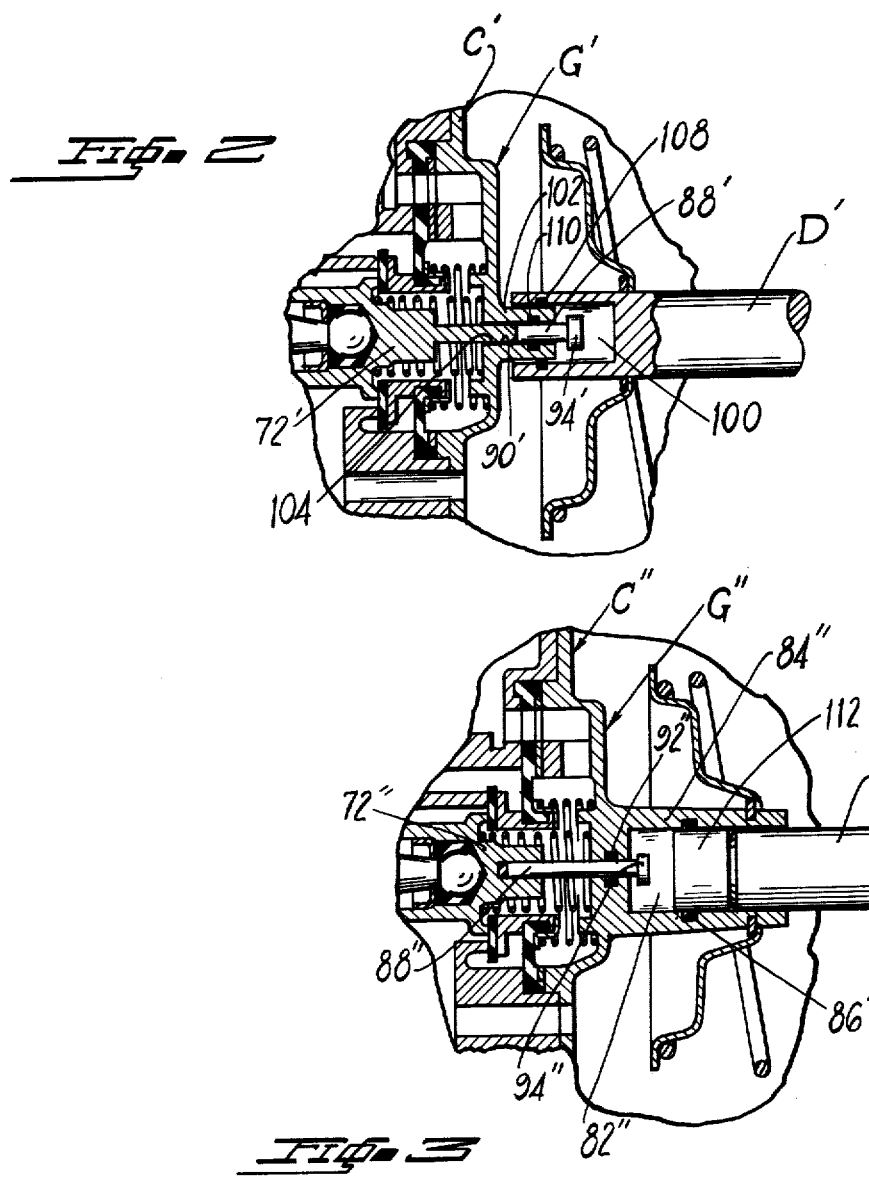

3,109,282
SERVOMOTOR CONSTRUCTION
Earl R. Price, South Bend, Ind., assignor to The Bendix Corporation, a corporation of Delaware
Continuation of application Ser. No. 699,383, Nov. 27, 1957. This application Aug. 21, 1959, Ser. No. 836,569
11 Claims. (Cl. 60—10.5)

The present invention relates to reaction means for servomotors generally; and more particularly to a new and improved fluid pressure servomotor construction of the type used in automotive braking systems in which the portions providing reaction to the operator are less expensive, greatly simplified and improved.

The present application is a continuation application of my copending application Serial No. 699,383, filed November 27, 1957, and now abandoned.

The fluid pressure servomotor driven master cylinders that will provide a reaction to the operator and with which applicant is familiar fall generally into two classes: the first of which employs a diaphragm against which the servomotor's actuating pressure differential is delivered to oppose the control movement of the operator; and the second of which employs a pressure sensing device in the driven hydraulic cylinder for delivering a reaction against the operator's control movement. Both of the above described constructions for providing reaction employ considerable mechanism which is expensive to manufacture. The second described construction has a further disadvantage in that it employs additional moving parts which contact the liquid in the hydraulic cylinder which therefore must be carefully made and assembled. The second type of construction has proven to be slightly less expensive than the first type of construction, and has, therefore, been generally accepted by the automotive braking industry.

An object of the present invention is the provision of a new and improved power operated master cylinder for automotive braking systems and the like having reaction providing structure which is considerably simplified and less expensive to manufacture than prior art mechanisms, which can be assembled expeditiously and which upon failure will not endanger the braking system which it actuates.

A futher object of the invention is the provision of new and improved reaction means which employs a minimum of parts that can be conveniently assembled and mounted in servomotors generally.

The invention resides in certain constructions and combinations and arrangements of parts, and further objects and advantages will become apparent to those skilled in the art to which the invention relates from the following description of the preferred embodiments described with reference to the accompanying drawings forming a part of the specification, and in which:

FIGURE 1 is a cross sectional view of a fluid pressure servomotor actuated master cylinder of the type used to actuate the braking systems of automotive vehicles, and which embodies principles of the present invention;

FIGURE 2 is a fragmentary cross sectional view of a portion of a servomotor similar to that shown in FIGURE 1 but incorporating a second embodiment of portions of the invention; and FIGURE 3 is a fragmentary cross sectional view of another servomotor similar to that shown in FIGURE 1 but showing a third embodiment of portions of the invention.

The fluid pressure servomotor driven master cylinder shown in FIGURE 1 generally comprises a hydraulic master cylinder "A" which is bolted to the front or closed end of a fluid pressure servomotor "B" having a power piston "C" therein which is adapted to drive or force a fluid displacement member "D" into the hydraulic master cylinder "A" to displace fluid therefrom. Actuation of the fluid pressure servomotor "B" is controlled by a control valve structure "E" which is carried by the power piston "C" and which in turn is controlled by a push rod "F" that extends through the cover plate on the rear end of the servomotor "B" and which is adapted to be moved by the brake pedal lever of an automotive vehicle.

The master cylinder "A" corresponds generally to the construction of that shown in the Edward E. Hupp Patent No. 2,864,632, and so will not be described in detail here. The master cylinder "A" shown in the drawings differs from that shown in the Hupp application principally in that the forward end of the present master cylinder "A" is provided with a removable plug for reasons which will later be described. Suffice it to say that the master cylinder "A" includes a reservoir 10 which is communicated with its fluid pressurizing chamber 12, into which the fluid displacement member "D" projects, through a check or tilt valve structure 14 which will close off flow from the chamber 12 to the reservoir 10 when the fluid displacement member "D" is actuated, and which will be tilted or opened by an abutment washer 16 on the fluid displacement member "D" when the fluid displacement member is retracted to cause the abutment washer 16 to engage the stem 18 of the tilt valve structure. In the retracted position of the fluid displacement member "D," the pressure in the pressurizing chamber 12 will be generally at atmospheric pressure, and any expansion or contraction of the fluid which had occurred during the previous application of the unit will be compensated for by the addition of fluid from the reservoir 10 into the pressurized chamber 12. The rear end of the pressure chamber 12 is closed off by annular sealing means positioned between the fluid displacement member "D" and the sidewalls of the pressurizing chamber 12, and which includes a retainer 20, lip seal 22, nonmetallic backup washer 24, metallic backup washer 26, snap ring 28, and vacuum seal 30.

The power piston "C" is formed by means of front and rear piston sections 32 and 34, respectively, which are bolted together to retain a seal 36 on its outer periphery and to provide an internal valve chamber within the power piston. The fluid pressure servomotor shown in the drawing is an atmospheric submerged one in which atmospheric pressure is provided on both sides of the power piston "C" during its normal deactuated condition, and is actuated by the communication of vacuum to the power chamber 38 on the front side of the power piston "C." Vacuum for the actuation of the servomotor is obtained usually from the manifold of the vehicle in which it is mounted, and is conducted through a short section of flexible hosing 40 to a forwardly opening annular vacuum chamber 42 which is formed in a boss 44 projecting rearwardly from the back side of the power piston "C." The front end of the annular vacuum chamber 42 is normally closed off by means of an annular valve poppet member 46 which has a small relatively stiff seating flange 48 on its rearwardly positioned end, and which has a larger flexible flange or diaphragm portion 50 on its forwardly positioned end. The radially outer edges of the diaphragm 50 are clamped between the piston sections 32 and 34 to effect a seal therewith, and the rear seating flange 48 is normally biased into engagement with an annular vacuum valve seat 52 formed on the radially inner partition wall of the annular vacuum chamber 42 by a coil spring 54 positioned between the front piston section 32 and the annular poppet member 46. Vacuum from the flexible connection 40 is normally confined within the vacuum chamber 42 by means of the radial extending diaphragm 50 and the abutment of the rear or seating flange 48 against the vacuum valve seat 52.

Control of the servomotor is had by the actuation of a movable control member 56 which is axially positioned inwardly of the vacuum valve chamber 42 and which is adapted to alternatively communicate either atmospheric pressure or vacuum to the front power chamber 38 during its actuation. The forwardly positioned end of the control member 56 is provided with an annular atmospheric valve seat 58 which is adapted to abut the seating flange 48 of the valve poppet member 46 just inwardly from the vacuum valve seat 52. The annular space 60 between the atmospheric and vacuum valve seats 58 and 52 respectively provides a control chamber 60 which communicates with the front power chamber 38 through passages 62 and 64 cast within the power piston "C." Atmospheric pressure is continually supplied to the rear side of the power piston "C" through air filter 66, an opening 68 in the sidewall of the servomotor, and thence through the cast atmospheric passageway 70 in the power piston "C" to the space forwardly of the diaphragm 50 and which in turn communicates with the atmospheric valve seat 58. In the normal condition of the servomotor, the movable control member 56 is positioned rearwardly out of engagement with the seating flange 48, such that its annular stop 72 abuts shoulder 74 in the rear end of the valve cavity. In this position air from the rear side of the power piston "C" is permitted to flow through the passage 70, control chamber 60, passages 62 and 64 to the front power chamber 38.

Actuation of the servomotor structure so far described is initiated by the depressing of the brake pedal lever of the vehicle (not shown), whereupon the control member 56 is moved axially inwardly to cause the atmospheric valve seat 58 to abut the seating flange 48 of the annular poppet member 46. Communication of atmospheric pressure from the rear side of the power piston "C" to the power chamber 38 is thereby broken off; and further inward movement of the control member 56 causes the annular poppet member 46 to be moved inwardly out of engagement with the vacuum seat 52 to thereafter communicate the valve's vacuum chamber 42 to the power chamber 38 through the control chamber 60 and the above described passageways. A decrease in pressure is then developed in the power chamber 38 (causing the power piston "C" to be moved forwardly and the fluid displacement member "D" to be forced into the pressurizing chamber 12 of the hydraulic master cylinder "A") thereby initiating a brake application of the vehicle. When the desired intensity of the brake application is reached, further forward movement of the push rod "F" is stopped, whereupon the power piston "C" continues to move forwardly just sufficiently to move the vacuum valve seat 52 into engagement with the seating flange 48 of the poppet member 46, to thereby prevent a further reduction in pressure within the power chamber 38.

If the operator desires to reduce the braking effort, the push rod "F" is retracted or permitted to move rearwardly; whereupon the atmospheric valve seat 58 of the control member 56 moves rearwardly out of engagement with the seating flange 48 of the poppet member to thereafter communicate atmospheric pressure from the rear face of the power piston "C" to the power chamber 38 to thereby decrease the pressure differential across the power piston. The hydraulic pressure within the master cylinder chamber 12 in conjunction with a return spring 76 positioned between the front end of the servomotor and a spring abutment plate 78 suitably affixed to the displacement member "D" causes the displacement member "D" and the power piston "C" to be moved rearwardly to follow up the retractile movement of the control member 56. When the desired reduction in intensity of brake application is reached and further movement of the control member 56 is stopped, a slight additional rearward movement of the power piston "C" will again bring the seating flange 48 of the valve poppet member 46 into engagement with the atmospheric valve seat 58 to thereafter prevent further pressure rise in the power chamber 38. A valve return spring 80 is provided for biasing the control member 56 rearwardly out of engagement with the poppet member 46; and if a complete release of the brakes is desired, removal of the operator's foot from the brake pedal lever will permit the control member 56 to be held in engagement with the shoulder 74 to cause full atmospheric pressure to be communicated with the power chamber 38, thereby atmospherically suspending the unit causing the power piston "C" to assume its retracted position shown in the drawing.

According to principles of the present invention, novel means are provided for applying a reactive force to the control member 56 to oppose its actuating movement by an amount which is generally proportional to the force applied to the fluid displacement member "D." The structure provided comprises a chamber 82 (of a pressurizable fluid preferably a liquid) operatively positioned between the power piston "C" and the fluid displacement member "D" to cause a pressurizing of the fluid contained therein to a degree generally proportional to the force being transmitted by the output member of fluid displacement member "D" of the servomotor. In the present instance the fluid pressurizable chamber 82 is formed within a forwardly extending boss 84 on the front side of the power piston "C" and into which the fluid displacement member "D" projects. An annular O-ring seal 86 is provided in the sidewalls of the chamber 82 to effect a seal with respect to the fluid displacement member. By such an arrangement it will be readily seen that a pressure will be produced within the chamber 82 which will vary proportionately to the force being delivered by the servomotor to its actuated member, which in this case is the fluid displacement member "D." Reaction force against the control member 56 is provided by a reaction pin 88 which abuts the front end of the control member 56 and extends through an opening 90 in the front wall of the power piston into communication with the chamber 82. A suitable O-ring seal 92 is provided in the sidewalls of the opening 90 for sealing engagement with the pin 88 thereby totally "sealing off" the chamber 82.

During actuation of the servomotor, the power piston "C" will be forced forwardly over the end of the fluid displacement member "D" to pressurize the liquid within the chamber 82. Pressure against the end 94 of the pin 88 within the chamber 82 causes the pin to be moved rearwardly to oppose actuating movement of the control member 56 by an amount proportional to the pressure within the chamber 82; and by appropriately sizing the diameter of the pin 88 with respect to the diameter of the driven member or fluid displacement member "D," practically any desired ratio of reactive force to delivered force can be obtained.

One of the difficulties inherent in the nature of the present invention is the difficulty encountered in filling and venting a totally enclosed body of liquid as is provided by the chamber 82. The pin 88 as shown in FIGURE 1 is provided with a head 94, for reasons which will later be described, and the clearance between the bottom of the head 94 and the bottom of the chamber 82 must also be fairly accurately controlled when the chamber 82 is filled with liquid in order to insure complete stroking of the valve, and a maximum filling of the chamber 82 with liquid. These conditions are made quite difficult to achieve when the units are to be assembled on an assembly line basis where each operation must be performed quickly using a minimum of the assembler's time.

According to further principles of the present invention it is intended that the power piston "C" will be assembled and placed in a generally horizontal plane with the head 94 of the pin 88 projecting upwardly from the O-ring seal 86. The chamber 82 will be completely filled with liquid, at least to a level above the seal 86, and the lower end of the displacement member "D" will be moved downwardly against the head 94 of the pin 88, and the two will thereafter be forced downwardly together to displace liquid out of the top of the chamber 82. Excess fluid will be forced past the seal 86 to remove any trapped air until such time as the lower end of the displacement member "D" effects a seal with respect to the O-ring 86 to thereafter prevent further escape of fluid from the chamber 82. Further downward movement of the displacement member "D" causes the pin 88 to move downwardly faster than the downward movement of the displacement member "D," by reason of the larger displacement of the fluid displacement member "D," until such time as the head 94 abuts the bottom of the chamber 82. Head 94 of the pin 88 will thereafter serve the purpose of preventing the pin 88 from being forced out of the opening 90. In some instances it will be desirable to provide a spring biased against the bottom of the pin 88 during the assembly operation to insure that the head 94 of the pin 88 will remain in engagement with the fluid displacement member "D" until such time as a seal is effected with respect to the O-ring 86.

Thereafter the assembly operation will be completed by the lowering of a servomotor housing to which a master cylinder "A" has been bolted over the top of the fluid displacement member "D" and the power piston "C." Prior to the time that the above described assembly operation has started, the fluid displacement member "D" will not be equipped with the abutment washer 16; such that the upper end of the fluid displacement member "D" may easily slip through the vacuum seal 30, backup washers 26 and 24, lip seal 22, and the retainer 20. The housing unit will be forced downwardly to completely compress the return spring 76, at which position the upper end of the fluid displacement member "D" will be adjacent to the upper end of the master cylinder "A," such that the abutment washer 16 may be slipped in place through the threaded opening in the upper end of the master cylinder and a suitable snap ring 96 installed to hold the abutment washer 16 in place. Thereafter the threaded plug 98 may be installed to complete this phase of the assembly operation.

As previously indicated, FIGURE 2 is a fragmentary view of a servomotor unit showing a slightly different modification or embodiment of the reaction means "G" in a servomotor which would otherwise be similar to that shown in FIGURE 1. In the embodiment shown in FIGURE 2, the pressurizable chamber 100, which is the equivalent of the chamber 82 in the first described embodiment, is formed in the rearwardly positioned end of the driven member or fluid displacement member D'. (Those portions of FIGURE 2 which are similar to the corresponding parts shown in FIGURE 1 will be designated by a like reference numeral characterized further in that a prime mark is affixed thereto.) The piston C' of the embodiment shown in FIGURE 2 is provided with an annular boss 102 adapted to project into the chamber 100, and is also provided with a central opening 104 adapted to carry reaction pin 88'. The reaction pin 88' of this embodiment will be slightly shorter than the pin 88 for reasons which will later be described, and the control member of this embodiment will be provided with an axially extending projection of the same diameter as the reaction pin 88' for abutment with the rearwardly positioned end of the reaction pin 88' within the opening 104.

Assembly of the structure shown in FIGURE 2 would be preferably accomplished with the fluid displacement member D' held vertically with the chamber 100 opening upwardly. Chamber 100 would be filled with liquid, and a piston C' having a headed pin 88' projecting downwardly therefrom would be lowered into the chamber 100. The pin 88' would be permitted to abut the bottom end of the chamber 100 prior to the time that the lower end of the boss 102 abuts the O-ring seal 108 in the sidewalls of the chamber 100. Pin 88' will preferably be of such a length that its upper end will be below the O-ring seal 110 in the opening 90' until such time as the lower end of the boss 102 engages the O-ring 108 to effect a seal therewith. During the lowering operation of the piston C' some fluid will be swept past the O-ring seal 108 to remove any trapped air therefrom, and some liquid will be forced out of the opening 90' past the O-ring seal 110 to remove air from the chamber 100. Immediately following the time that the lower end of the piston C' effects a seal with respect to the O-ring seal 108, the top end of the reaction pin 88' will abut the O-ring seal 110 to effect a seal therewith; and thereafter the piston C' may be forced downwardly causing the reaction pin 88' to move upwardly until such time as its head 94' abuts the lower end of the boss 102. Further downward movement will thereafter be prevented; and the unit may thereafter be inverted, and a servomotor housing to which a master cylinder has been attached may be lowered over the upper end of the fluid displacement member D' in a manner similar to that previously described for the structure shown in FIGURE 1.

As previously indicated, FIGURE 3 is a fragmentary cross sectional view of a portion of a fluid pressure servomotor similar in many respects to that shown in FIGURE 1, and which shows a third embodiment of portions of the present invention. Those portions of FIGURE 3 which correspond to similar portions shown in FIGURE 1 will be designated by a like reference numeral and will be characterized further in that a double prime mark will be affixed thereto.

The structure shown in FIGURE 3 is intended to be used with a master cylinder having an integrally cast closed forward end similar to that shown in previously referred to Hupp Patent No. 2,864,632. In the embodiment shown in FIGURE 3, the boss 84" is slightly elongated from that shown in FIGURE 1 so as to provide a longer guide portion between the seal 86" and the forward end of the boss 84". A plug 112 is provided for effecting a seal with respect to the O-ring 86" for reasons which will be apparent from the description of its assembly operation.

The structure shown in FIGURE 3 is intended to be assembled with an assembled power piston C" supported horizontally with its boss 84" opening upwardly. With the head 94" of the reaction pin 88" supported at a position upwardly from the O-ring seal 86", liquid is poured into the chamber 82" until its level is above the O-ring seal 86". A plug 112 will be installed in the upper end of the boss 84", and will be forced downwardly against the head 94" of the pin 88" to force air and excess liquid around the O-ring seal 86" and past the plug 112. Downward movement of the plug 112 will continue until a seal is effected with respect to the O-ring seal 86" and thereafter, the reaction pin 88" will move downwardly until its head 94" is in engagement with the bottom end of the chamber 82". The piston C" can then be moved about and transferred freely, inasmuch as the plug 112 will be wholly positioned within the boss 84", and the reaction pin 88" will be totally enclosed within the power piston C". In those instances when a force must be exerted against the lower end of the reaction pin 88" in order to assure that it will be held into engagement with the plug 112 when the plug 112 is being forced into the chamber 82", the above described assembly operation may be performed prior to the time that the front piston section 32 is bolted to the rear piston section 34.

When the closed end type of master cylinder shown in the Hupp Patent No. 2,864,632 is to be used, the abutment washer 16 will be installed upon the fluid displacement member D" and the fluid displacement member will be lowered into the open end of a master cylinder. Thereafter the elements 20, 22, 24, 26, 28, and 30 will be forced downwardly over the fluid displacement member D" into their correct positions, and a servomotor housing will be lowered around the exposed end of the fluid displacement member D" for its bolting to the master cylinder. The return spring 76 and spring abutment plate 78 will thereafter be installed; and a power piston C" which has been assembled as previously described, may be lowered into the servomotor housing over the upper end of the fluid displacement member D".

It will be apparent that the objects heretofore enumerated as well as others have been accomplished by the present invention; and that a new and improved type of reaction structure has been provided which is totally contained within the power driven portions of the servomotor unit, and which can be simply and expeditiously assembled.

While the invention has been described in considerable detail, I do not wish to be limited to the particular construction shown and described; and it is my intention to cover hereby all novel adaptations, modifications, and arrangements thereof which come within the practice of those skilled in the art to which the invention relates and which come within the purview of the following claims.

I claim:

1. A servomotor comprising: a body member; a power actuated member in said body member; a driven member; one of said power actuated and driven members having a chamber therein into which the other projects; one of said power actuated and driven members having an opening therein communicating with said chamber; a control member for said servomotor which control member when moved towards said chamber causes said power actuated and driven members to be forced together tending to decrease the volume of said chamber, said control member having a portion projecting into said opening and being constructed and arranged to oppose actuating movement of said control member when said portion is forced outwardly of said chamber; and a hydraulic fluid in said chamber for transmitting pressure against said portion of said control member, whereby actuating force of said control member is opposed by a force generally proportional to the force being transmitted by said driven member.

2. A servomotor comprising: a body member; a power actuated member in said body member; a driven member; one of said power actuated and driven members having a chamber therein into which the other projects; a stationary seal supported by said one of said power actuated and driven members for engagement with the member which projects therein to close off said chamber; one of said power actuated and driven members having an opening therein communicating with said chamber; a control member for said servomotor which control member when moved towards said chamber causes said power actuated and driven members to be forced together to decrease the volume of said chamber, said control member having a portion projecting into said opening and being constructed and arranged to oppose actuating movement of said control member when said portion is forced outwardly of said chamber, a stationary seal supported by said last mentioned one of said power actuated and driven members for engagement with said portion of said control member to close off said opening, and a pressurizable material in said chamber for transmitting pressure against said portion of said control member, whereby actuating force of said control member is opposed by a force generally proportional to the force being transmitted by said driven member.

3. A servomotor comprising: a body member; a power actuated member in said body member; a driven member; one of said power actuated and driven members having a chamber therein into which the other projects; said power actuated and driven members having cooperating surfaces which slidably receive each other, one of said surfaces having an annular recess therein; an annular seal in said recess slidably sealingly engaging the other of said surfaces; one of said power actuated and driven members having an opening therein communicating with said chamber; a control member for said servomotor which control member when moved towards said chamber causes said power actuated and driven members to be forced together to decrease the volume of said chamber, said control member having a portion projecting into said opening and being constructed and arranged to oppose actuating movement of said control member when said portion is forced outwardly of said chamber; said portion of said control member and its receiving opening having cooperating surfaces which slidably receive each other, one of said surfaces having an annular recess therein; an annular seal in said recess slidably sealingly engaging the other of said surfaces; and a hydraulic fluid in said chamber for transmitting pressure against said portion of said control member, whereby actuating force of said control member is opposed by a force generally proportional to the force being transimtted by said driven member.

4. A servomotor comprising: a body member; a power actuated member in said body member; a driven member; one of said power actuated and driven members having a chamber therein into which the other projects; the surface of said chamber having an annular recess therein; an annular seal in said recess for slidingly sealingly engaging the other of said power actuated and driven members; one of said power actuated and driven members having an opening therein communicating with said chamber, the surface of said opening having an annular recess therein; a control member for said servomotor which control member when moved towards said chamber causes said power actuated and driven members to be forced together to decrease the volume of said chamber, said control member having a portion projecting into said opening and being constructed and arranged to oppose actuating movement of said control member when said portion is forced outwardly of said chamber; an annular seal in said recess of said opening for slidingly sealingly engaging said portion of said control member; and a hydraulic fluid in said chamber for transmitting pressure against said portion of said control member, whereby actuating force of said control member is opposed by a force generally proportional to the force being transmitted by said driven member.

5. In structure for providing reaction force generally proportional to a delivered force: a body member; axially aligned power actuated and driven members in said body member; one of said power actuated and driven members having an axially extending chamber into which chamber the other of said members slidingly sealingly projects, a body of pressurizable material isolated in said chamber when said power actuated member is moved toward said driven member, said driven member being actuated by the pressure forces generated in said chamber when said power actuated member moves towards said driven member, and a pin slidingly sealingly received by one of said members and the end of which communicates with said chamber and by which a reactive force is developed which is indicative of the force being transmitted to said driven member by said power actuated member.

6. In structure for providing reaction force generally proportional to a delivered force: a body member; axially aligned power actuated and driven members in said body member, said power actuated member being adapted to be power actuated in a forward axial direction, said driven member having a portion positioned forwardly of a forwardly facing portion of said power actuated member, one of said portions of said members having an axially extending generally cylindrically shaped chamber opening outwardly thereof and into which chamber the other of said portions projects, first means for affecting a seal between said portions, one of said portions having an axially extending opening communicating with said chamber, a pin in said opening projecting into said chamber, second means for effecting a sliding seal between said pin and power actuated member, a body of pressurizable material isolated in said chamber by said pin, driven member and sealing means when said power actuated member is moved toward said driven member, said driven member being actuated by the pressure forces generated in said chamber when said power actuated member moved forwardly, said pin being subjected to the pressure forces generated in said chamber to deliver a reactive force indicative of the force being transmitted from said power actuated member to said driven member.

7. In structure for providing reaction force generally proportional to a delivered force; a body member, axially aligned power actuated and driven members in said body member, said power actuated member being adapted to be power actuated in a forward axial direction, said driven member having a portion positioned forwardly of a forwardly facing portion of said power actuated member, said portion of said driven member having an axially extending generally cylindrically shaped chamber opening outwardly thereof and into which chamber the other of said portions projects, first means for effecting a seal between said portions, said portion of said power actuated member having an axially extending opening communicating with said chamber, a pin in said opening projecting into said chamber, said pin having an abutment portion thereon preventing it from being forced out of said opening, said means for effecting a sliding seal between said pin and power actuated member, said members having a spaced apart position from which said portions may be telescoped together, and in which said second means is spaced a predetermined distance from the end wall of said chamber, said pin having a length less than said predetermined distance, a body of pressurizable material isolated in said chamber by said pin, driven member and sealing means when said power actuated member is moved toward said driven member, said driven member being actuated by the pressure forces generated in said chamber when said power actuated member moved forwardly, said pin being subjected to the pressure forces generated in said chamber to deliver a reactive force indicative of the force being transmitted from said power actuated member to said driven member.

8. In structure for providing reaction force generally proportional to a delivered force: a body member; axially aligned power actuated and driven members in said body member, said power actuated member being adapted to be power actuated in a forward axial direction and having an axially extending chamber opening outwardly of said power actuated member in a forward direction, said driven member projecting into the forward end of said chamber, means for effecting a seal between said power actuated and driven members, said power actuated member having an axially extending opening extending rearwardly from said chamber, a pin in said opening projecting into said chamber, second means for effecting a sliding seal between said pin and power actuated member, a body of pressurizable material isolated in said chamber by said pin, driven member and sealing means when said power actuated member is moved toward said driven member, said driven member being actuated by the pressure forces generated in said chamber when said power actuated member moves forwardly, said pin being subjected to the pressure forces generated in said chamber to deliver a reactive force indicative of the force being transmitted from said power actuated member to said driven member.

9. In structure for providing reaction force generally proportional to a delivered force: a body member; axially aligned power actuated and driven members in said body member, said power actuated member being adapted to be power actuated in a forward axial direction and having an axially extending chamber opening outwardly of said power actuated member in a forward direction, a plug in said chamber and against which said driven member is adapted to abut, means for effecting a seal between said plug and driven members, said power actuated member having an axially extending opening extending rearwardly from said chamber, a pin in said opening projecting into said chamber, said pin having an abutment portion thereon preventing it from being forced out of said opening, second means for effecting a sliding seal between said pin and power actuated member, a body of pressurizable material isolated in said chamber by said pin, plug and sealing means when said power actuated member is moved toward said driven member, said driven member being actuated by the pressure forces generated in said chamber when said power actuated member moves forwardly, said pin being subjected to the pressure forces generated in said chamber to deliver a reactive force indicative of the force being transmitted from said power actuated member to said driven member.

10. A brake booster mechanism, comprising, a fluid pressure operated motor having a casing with a pressure responsive unit therein, means providing power transmitting means operably connecting said pressure responsive unit effective for transmission of force from said pressure responsive unit and to receive reaction force, a manually operable member including a follow-up control valve mechanism having a normal "off" position balancing pressures in said motor and being movable from said "off" position for actuation of said manually operable member to establish differential pressures in said motor to actuate said pressure responsive unit means forming a liquid confining chamber and containing a body of liquid between said manually operable member and said power transmitting means, said manually operable member and said power transmitting means each having end portions exposed to said chamber and engageable with the liquid confined in said chamber whereby to transmit pressure reaction forces from said power transmitting means to said manually operable member in a predetermined proportion of the total reaction force acting on said power transmitting means.

11. For use with a servomotor mechanism having a power device, means controlling said power device, force transmitting means operatively connected to said power device, said force transmitting means including a driven member and a driving member with one of said members having a chamber therein into which the other member projects, a hydraulic fluid in said chamber to be pressurized upon actuation of said power device, and reaction means operatively connected to said controlling means and to said force transmitting means to sense a proportionate amount of the pressurization of said hydraulic fluid.

References Cited in the file of this patent

UNITED STATES PATENTS

| | | |
|---|---|---|
| 2,318,437 | Vickers | May 4, 1943 |
| 2,577,852 | Hufferd | Dec. 11, 1951 |
| 2,735,268 | Stelzer | Feb. 21, 1956 |
| 2,754,806 | Funston | July 17, 1956 |
| 2,811,836 | Ayers | Nov. 5, 1957 |
| 2,826,042 | Rike et al. | Mar. 11, 1958 |
| 2,861,427 | Whitten | Nov. 25, 1958 |
| 2,862,365 | Ingres et al. | Dec. 2, 1958 |

UNITED STATES PATENT OFFICE
CERTIFICATE OF CORRECTION

Patent No. 3,109,282 November 5, 1963

Earl R. Price

It is hereby certified that error appears in the above numbered patent requiring correction and that the said Letters Patent should read as corrected below.

Column 1, line 47, for "futher" read -- further --; column 8, line 20, for "transimtted" read -- transmitted --; column 9, line 28, for "said", second occurrence, read -- second --.

Signed and sealed this 9th day of June 1964.

(SEAL)
Attest:

ERNEST W. SWIDER
Attesting Officer

EDWARD J. BRENNER
Commissioner of Patents